United States Patent Office 3,198,148
Patented Aug. 3, 1965

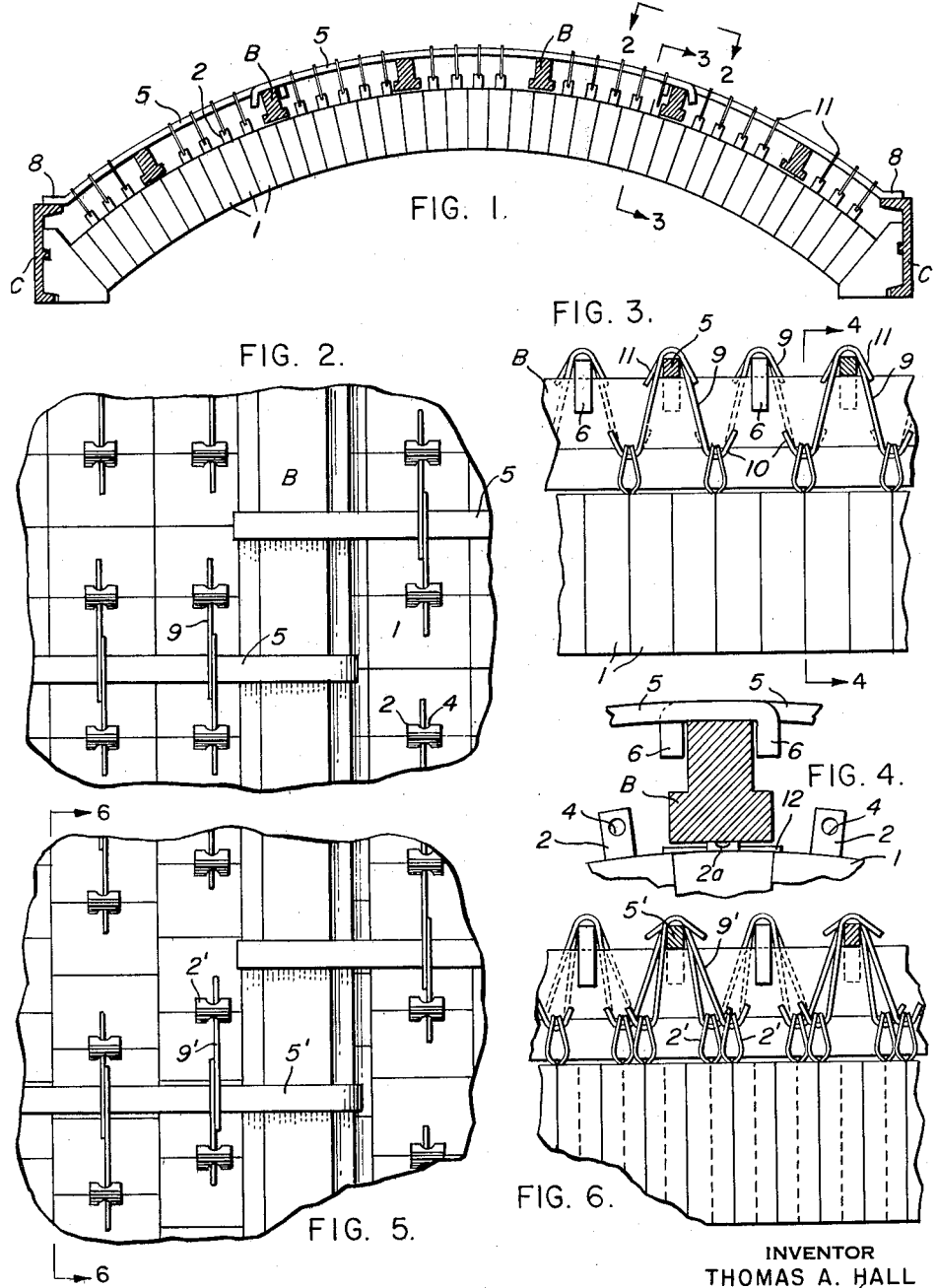

3,198,148
METALLURGICAL FURNACE ROOF
Thomas A. Hall, Canfield, Ohio, assignor to The Youngstown Sheet and Tube Company, Youngstown, Ohio, a corporation of Ohio
Filed Oct. 22, 1963, Ser. No. 317,901
2 Claims. (Cl. 110—99)

This invention relates to metallurgical furnaces and more particularly to the structure and maintenance of the roofs of open hearth furnaces used for making and refining steel wherein extremely high temperatures and rapidly moving gases subject the roof to constant erosion from within.

In such furnaces, moreover, changes in temperature alone through differential expansion and contraction of furnace components may complicate maintenance problems many of which are of relatively recent origin due to the present trend toward use of oxygen to accelerate chemical processes in the furnace and hence the production of steel whereby temperatures are attained which are higher than the silica refractory bricks, satisfactory at lower temperatures, can tolerate.

But basic refractory bricks, while relatively compatible with such higher temperatures, especially when clad with metallic jackets which help to dissipate conducted heat, are less desirable from a weight/strength standpoint and are prone to fracture under localized stress more readily than do silica bricks.

It is therefore an object of the invention to provide means primarily useful in connection with basic refractory brick furnace roofs for providing localized support to the individual bricks whereby erection of the roof may be simplified, the cost thereof minimized, and the campaign of the furnace considerably enhanced while repair of the roof by replacement of a relatively small number of the bricks when, due to some unusual condition, a localized "burn down" has occurred is rendered practical.

Another object is to provide a furnace roof in which the outer end surfaces of the bricks forming the roof, herein sometimes called their cold ends, are exposed between longitudinally extending hold-down beams to permit uniform circulation of air over and dissipation of heat from said cold ends thereby tending to minimize localized areas in which overheating might tend to induce or promote spalling or other failure within the furnace at the opposite or hot ends of the bricks.

A still further object is to provide a structure in which the bricks of a furnace roof or the like are suspended from reusable supporting hangers, and each of a plurality of such hangers is in turn supported by a transversely extending rod spaced from the cold ends of the bricks and conforming generally to a segment of the roof arch.

Other objects, purposes and advantages of the invention will hereinafter more fully appear or will be understood from the following description of certain procedures suitable for erecting a furnace roof in accordance therewith and of the structures resulting therefrom as illustrated in the accompanying somewhat diagrammatic drawing wherein:

FIG. 1 is a fragmentary tranverse vertical section of an open hearth furnace comprising such a roof;

FIG. 2 is an enlarged fragmentary plan view of the roof on line 2—2 in FIG. 1.

FIG. 3 is a fragmentary radial section on line 3—3 in FIG. 1;

FIG. 4 is a fragmentary detail section on line 4—4 in FIG. 3;

FIG. 5 is a view corresponding to FIG. 2 but illustrating another embodiment of the invention, and FIG. 6 is a fragmentary section on line 6—6 in FIG. 5.

Referring now more in detail to the drawings, the roof shown in FIG. 1 is constructed principally of metal clad bricks 1, each having at its cold end a projecting perforated metal tab 2 individually of well known construction such as the tab bricks made with basic refractories shown and described in U.S. Patent 3,093,099, granted June 11, 1963 to Chester E. Grigsby for Refractory Roof Construction. More specifically, tab 2 projects from the cold end of each brick adjacent an edge at approximately its midpoint and may be either welded to or integral with the metal jacket or casing whereby the bricks may be brought together in pairs with the tab of each brick closely adjacent the tab of the other brick of its pair and the perforations 4 in their tabs aligned to receive a common supporting element.

The bricks may be placed in position to form the roof either with the aid of internal wood or other temporary forms complementary to the under side of the roof contour or external supporting means may be first installed and the bricks suspended therefrom on tension elements without the use of such forms, as preferred. In either case the furnace comprises the usual skew back construction including channels C at the upper edges of its front and back walls and spaced hold-down beams B, which may be fabricated from plate, rod, pipe or structural sections as preferred, their specific construction constituting no part of the present invention. They parallel the skew back channels, however, and closely conform to the external arch of the furnace roof, being supported at their ends on the structural frame binding (not shown) of the furnace while those nearest channels C at the front and back of the furnace may be afforded additional support, if desired, from the front and back buckstays (not shown).

In FIGS. 2 and 3 the bricks are arranged in the roof in what is known in the art as a ring type construction in which transverse courses of bricks are laid side by side in successive arched ring sgements without interlacing of adjacent courses as in the bonded construction illustrated in FIGS. 5 and 6 wherein the bricks of adjacent courses overlap to "break" the joints. As both types of construction are well known and have been used more or less interchangeably no further description of the arrangement of the individual bricks is required.

The structure from which the bricks are suspended and in a large measure supported in conjunction with the arched configuration of the roof whereby each brick other than those directly in contact with one or the other of the skew back channels may receive some support from an adjacent one, comprises a plurality of spaced hanger rods 5, disposed transversely of the roof and except at the front and back of the furnace resting on the hold-down beams B. These rods where they engage the beams may be welded thereto, each rod spanning two or more beams, and their ends 6 bent downwardly to hook over the edges of the adjacent beams while the rods ending at the skew back channels C are preferably bent outwardly in a horizontal plane at 8 to rest on the upper webs of the channels. The said rods, shown as square in section, may of course be of any desired construction, including tubular, provided they possess adequate strength, and each supports from a plurality of tension elements, specifically hangers 9, a corresponding number of pairs of bricks, each hanger having at one end a hook-like configuration 10 extending through perforations 4 in the tabs of each of two adjacent bricks and at the other end a somewhat similar hook 11 embracing an adjacent hanger rod.

As the cold ends of the bricks preferably conform closely to the arch defined at intervals by the hold-down beams it is usually preferable not to have tabs 2 project outwardly from the bricks which underlie said beams. Hence the metal jackets of those bricks may be welded to those of adjacent bricks and the tabs 2a either removed or disposed flat against the brick end as preferred, or a short length of rod 12 may be disposed on either side of the pair of tabs and the latter bent down over them, rods 12 then deriving support at their ends from adjacent bricks in the same course as shown in FIG. 4.

In the ring type of roof the hanger 9 may be substantially identical and hence of the same length but when a bonded construction is used it is normally most convenient to employ hangers 9' of different lengths corresponding to the spacing of pairs of brick tabs 2' from adjacent hanger rods 5'. While it is practical to preform these hangers mechanically in predetermined lengths at may sometimes be more convenient to have only the hooks 10 designed to engage the brick tabs mechanically preformed leaving straight the free end of the rod from which the other hook is to be made and then bending it over the hanger rod manually as the roof is being erected whereby the length of the hanger between its end hooks is automatically accommodated to the distance from the brick tabs to the adjacent hanger rod.

As each pair of bricks in the roof, whether of ring or bonded construction, save those few whose tabs lie directly under a hold-down beam B, has support which is independent of adjacent bricks in contact therewith, excessive compression stresses on the individual bricks unavoidable in free standing arch construction are in large measure relieved and the useful life of the furnace roof is thereby prolonged; localized repair of the roof moreover may be accomplished by removing and replacing one or several pairs of bricks and this may be done without dislodging adjacent bricks not requiring replacement, an advantage of considerable merit over the arch construction in which each brick supports and is supported by an adjacent brick and none can be removed without endangering the integrity of a whole course of bricks or even more.

It is usually possible to effect such repairs while the furnace is hot by suspending a protective shield or plate of iron in the furnace beneath the roof from hangers (not shown) engaging the hanger rods 5 to protect workmen from the furnace heat while replacing roof bricks but as this procedure constitutes no part of the invention further discussion of it would be superfluous.

If desired metal cased bricks devoid of perforated tabs but provided with indentations or holes suitable for reception of supporting hooks or hangers may be used and erected in accordance with the invention substantially as herein described, the precise shape of the brick engaging hooks on the hangers being modified if necessary for insertion in said indentations or holes to enable them to support the bricks from the appropriate hanger rods the number and spacing of which may of course be accommodated to conditions which sometimes differ as to brick size, the number of bricks supportable from a single hanger and in other respects which can be compensated for within ordinary skill in the art.

While I have herein shown and described with considerable particularity certain embodiments of my invention it will be understood I do not desire or intend to be restricted or confined thereby or thereto in any way as changes and modifications in the form, structure, arrangement and relationship of the several components of the roof will readily occur to those skilled in the art and may be utilized if desired without departing from the spirit and scope of the appended claims.

Having thus described my invention, I claim and desire to protect by Letters Patent of the United States:

1. A roof structure for a metallurgical furnace having a plurality of spaced relatively rigid elongated supporting elements constituting hold down beams extending longitudinally of the furnace and substantially defining the external contour of the roof, a plurality of refractory bricks disposed in side-by-side relation, each brick having a hanger receiving tab adjacent an edge thereof, the tab of each brick being disposed in proximity to that of an adjacent brick, transverse rods extending in spaced relation between adjacent pairs of said supporting elements, and a hanger extending into said tabs of substantially each pair of adjacent bricks and also engaging one of said transverse rods to support said pair of bricks therefrom, said rods being spaced from the bricks supported thereby a distance approximating the width of the supporting elements measured outwardly from said external contour of the roof.

2. In a basic refractory furnace roof comprising a plurality of independently supported metal encased basic refractory bricks and spaced hold-down beams extending longitudinally of the roof, a plurality of rods interposed between said beams and the cold ends of the respectively subjacent bricks, and tabs projecting from said bricks and overlying said rods for supporting said subjacent bricks therefrom, the ends of said rods extending outwardly beyond the edges of said bricks and into engagement with independently supported bricks aligned therewith to support said rods from said independently supported bricks.

References Cited by the Examiner

UNITED STATES PATENTS

| | | | |
|---|---|---|---|
| 2,222,978 | 11/40 | Kiren | 110—99 |
| 2,840,017 | 6/58 | Wolf | 110—99 |
| 2,929,343 | 3/60 | Hutter | 110—99 |
| 3,093,099 | 6/63 | Grigsby | 110—99 |

FOREIGN PATENTS

| | | |
|---|---|---|
| 168,088 | 9/56 | Australia. |
| 623,230 | 12/35 | Germany. |
| 771,895 | 4/57 | Great Britain. |

JAMES W. WESTHAVER, *Primary Examiner.*

ROBERT A. DUA, *Examiner.*